US012735509B2

(12) United States Patent
Kato et al.

(10) Patent No.: US 12,735,509 B2
(45) Date of Patent: Sep. 15, 2026

(54) METHOD FOR PRODUCING STARCH COMPOSITION

(71) Applicant: J-OIL MILLS, INC., Tokyo (JP)

(72) Inventors: Kenta Kato, Tokyo (JP); Ayuna Mizushina, Tokyo (JP); Tsukasa Kasahara, Tokyo (JP)

(73) Assignee: J-OIL MILLS, INC., Tokyo (JP)

( * ) Notice: Subject to any disclaimer, the term of this patent is extended or adjusted under 35 U.S.C. 154(b) by 508 days.

(21) Appl. No.: 18/256,658

(22) PCT Filed: Dec. 16, 2021

(86) PCT No.: PCT/JP2021/046460
§ 371 (c)(1),
(2) Date: Jun. 9, 2023

(87) PCT Pub. No.: WO2022/138428
PCT Pub. Date: Jun. 30, 2022

(65) Prior Publication Data

US 2024/0034817 A1 Feb. 1, 2024

(30) Foreign Application Priority Data

Dec. 25, 2020 (JP) ................................ 2020-216129

(51) Int. Cl.
*C08B 31/00* (2006.01)
*A23L 29/219* (2016.01)

(52) U.S. Cl.
CPC .......... *C08B 31/003* (2013.01); *A23L 29/219* (2016.08)

(58) Field of Classification Search
CPC ......... A23L 5/00; A23L 29/219; C08B 30/12; C08B 30/18
See application file for complete search history.

(56) References Cited

U.S. PATENT DOCUMENTS

| | | | |
|---|---|---|---|
| 5,358,729 A | 10/1994 | Ohkuma et al. | |
| 6,277,186 B1 | 8/2001 | Shi et al. | |
| 2011/0020530 A1 | 1/2011 | Nakajima et al. | |
| 2014/0087052 A1* | 3/2014 | Kawai | A23L 13/67 426/578 |
| 2015/0201654 A1 | 7/2015 | Essers et al. | |
| 2020/0138076 A1 | 5/2020 | Essers et al. | |
| 2022/0002443 A1* | 1/2022 | Sunako | A61K 8/732 |

FOREIGN PATENT DOCUMENTS

| | | | |
|---|---|---|---|
| EP | 530111 A1 | 3/1993 | |
| EP | 0721471 A1 | 7/1996 | |
| EP | 1038882 A1 | 9/2000 | |
| EP | 1102792 | 5/2001 | |
| EP | 1102792 B1 * | 2/2008 | A23L 29/219 |
| GB | 2259917 | 3/1993 | |
| JP | 06-080701 | 3/1994 | |
| JP | H09-503549 | 7/1996 | |
| JP | 2003-501494 | 1/2003 | |
| WO | WO9603891 A1 | 2/1996 | |
| WO | WO9604315 A1 | 2/1996 | |
| WO | WO9604316 A1 | 2/1996 | |
| WO | WO 2000/073353 A | 12/2000 | |
| WO | WO 2009/110610 | 9/2009 | |
| WO | WO 2018/216748 | 11/2018 | |
| WO | WO 2020/090997 | 5/2020 | |

OTHER PUBLICATIONS

Singh et al., Carbohydrate Polymers, 2000, 41, p. 191-195. (Year: 2000).*

Irving Martin, Crosslinking of Starch by Alkaline Roasting. Journal of Applied Polymer, Science. 1967, vol. 11, pp. 1283-128.

International Search Report dated Feb. 22, 2022; Application No. PCT/JP2021/046460.

Extended European Search Report dated Nov. 14, 2024; Application No. PCT/JP2021/046460; 6 pg.

* cited by examiner

*Primary Examiner* — Jonathan S Lau
(74) *Attorney, Agent, or Firm* — RANKIN, HILL & CLARK LLP; Erik J. Overberger

(57) ABSTRACT

The present invention relates to a method for producing a starch composition. The method for producing a starch composition according to the present invention comprises the steps of: (a) preparing a raw material mixture which contains a raw starch material, one or more selected from the group consisting of an acid-treated starch and a dextrin, and an aqueous alkaline solution, the raw material mixture having a moisture content of 20 parts by mass or more and 35 parts by mass or less per 100 parts by mass of the raw material mixture; and (b) heat-treating the raw material mixture having a moisture content of 20 parts by mass or more and 35 parts by mass or less obtained in step (a) to a temperature at which the raw material mixture becomes 120° C. or higher and 150° C. or lower. The present invention can provide a starch composition that does not swell or swell less upon heating and that is heat resistant, using a simple method.

16 Claims, No Drawings

METHOD FOR PRODUCING STARCH COMPOSITION

TECHNICAL FIELD

The present invention relates to a method for producing a starch composition.

BACKGROUND ART

In recent years, the trend toward food safety and security by consumers has been increasing, and the demand for food products that give the impression of natural ingredients on their food labels, known as clean labels, is growing rapidly. However, the functions required for the food texture and handling of processed food products and the like are only increasing. Therefore, there is a need to provide food products that give the impression of natural ingredients on their food labels but that are also functional.

Also, with regard to starches, there is a need to provide a novel material that is imparted with the same functions as those of conventional modified starches without the need for a substance or chemical treatment that must be written on food labels. Among modified starches, cross-linked starches are used in a variety of processed food products because they are easily soluble in water and swell less when heated.

For example, Patent literature 1 describes that a thermally inhibited starch that has functions similar to those of a cross-linked starch can be obtained by dehydrating a starch to a substantially anhydrous state and subjecting it to heat treatment at a temperature of 100° C. or higher.

Patent literature 2 describes that a thermally inhibited starch can be obtained by blending a starch and an oligosaccharide as a slurry in an aqueous solution, dehydrating the slurry to an anhydrous or substantially anhydrous state, and then subjecting it to heat treatment.

CITATION LIST

Patent Literature

Patent literature 1: Japanese Unexamined Patent Application Publication (translation of PCT) No. H09-503549

Patent literature 2: Japanese Unexamined Patent Application Publication No. 2003-501494

SUMMARY OF INVENTION

Technical Problem

However, conventional methods have problems such as leaching of the raw starch material and auxiliary material component in the dehydrating solution by undergoing the dehydration step, the raw starch material being likely to be damaged by heat due to the dehydration and heating steps, and reduced productivity due to the large number of steps and equipment required.

In addition, from the viewpoint that cross-linked starches can control swelling upon heating, a higher degree of cross-linking has been attempted. However, as the degree of cross-linking increases, the highest viscosity upon heating decreases, making it difficult to give the desired texture to the food product.

Under these circumstances, it would be desirable to be able to provide a starch composition with functions similar to those of cross-linked starches that do not swell or swell less upon heating and that are heat resistant, using a simpler method. It is even more desirable to provide a starch composition that has a highest viscosity close to that of its raw starch material, but that shows less swelling upon heating or that is resistant to heating.

Solution to Problem

The present invention provides a method for producing a starch composition which is shown below.

[1] A method for producing a starch composition, comprising the steps of:
- (a) preparing a raw material mixture which contains a raw starch material, one or more selected from the group consisting of an acid-treated starch and a dextrin, and an aqueous alkaline solution, the raw material mixture having a moisture content of 20 parts by mass or more and 35 parts by mass or less per 100 parts by mass of the raw material mixture; and
- (b) heat-treating the raw material mixture having a moisture content of 20 parts by mass or more and 35 parts by mass or less obtained in step (a) to a temperature at which the raw material mixture becomes 120° C. or higher and 150° C. or lower.

[2] The method for producing a starch composition according to [1] above, wherein the mass ratio of the raw starch material is 56 parts by mass or more and 79 parts by mass or less to 100 parts by mass of the raw material mixture.

[3] The method for producing a starch composition according to either one of [1] and [2] above, wherein the mass ratio of the acid-treated starch is 0.5 parts by mass or more and 20 parts by mass or less to 100 parts by mass of the raw material mixture.

[4] The method for producing a starch composition according to any one of [1] to [3] above, wherein the mass ratio of the dextrin is 0.1 parts by mass or more and 20 parts by mass or less to 100 parts by mass of the raw material mixture.

[5] The method for producing a starch composition according to any one of [1] to [4] above, wherein the number-average molecular weight of the acid-treated starch is 250,000 or more and 500,000 or less.

[6] The method for producing a starch composition according to any one of [1] to [5] above, wherein the DE (dextrose equivalent: degree of degradation) of the dextrin is 5 or higher but less than 50.

[7] The method for producing a starch composition according to any one of [1] to [6] above, wherein the dextrin is an aqueous dextrin solution.

[8] The method for producing a starch composition according to any one of [1] to [7] above, wherein an alkali used in the aqueous alkaline solution is one or more selected from the group consisting of calcium hydroxide, sodium carbonate, calcium carbonate, potassium carbonate, sodium hydrogen carbonate, and dipotassium hydrogen phosphate.

[9] The method for producing a starch composition according to any one of [1] to [8] above, which does not require, between steps (a) and (b), a step of dehydrating the raw material mixture until the moisture content therein becomes less than 1 part by mass per 100 parts by mass of the raw material mixture.

[10] The method for producing a starch composition according to any one of [1] to [9] above, wherein the raw material mixture further contains an edible oil/fat.

[11] The method for producing a starch composition according to [10] above, wherein the mass ratio of the edible oil/fat is 0.05 parts by mass or more and 1.5 parts by mass or less to 100 parts by mass of the raw material mixture.

[12] The method for producing a starch composition according to any one of [1] to [9] above, further comprising the steps of:
 (c) washing the heat-treated product obtained in step (b) by adding water and a pH adjuster; and
 (d) dehydrating or drying the washed product obtained in step (c).

Advantageous Effects of Invention

The present invention can provide a starch composition that has a swelling control function similar to that of chemically cross-linked starches, using a simpler method. According to a preferred embodiment of the present invention, it is possible to provide a starch composition that has a highest viscosity close to that of its raw starch material, yet shows a high swelling control effect upon heating and is retort resistant.

DESCRIPTION OF EMBODIMENTS

Hereinafter, the present invention will be described more specifically. According to the present invention, in addition to the raw starch material, one or more selected from the group consisting of the acid-treated starch and the dextrin, and the aqueous alkaline solution, an edible oil/fat can be further added to the raw material mixture so that not only a swelling control function upon heating is imparted to the raw starch material but also modification with an oil/fat can be performed. Hereinafter, a first aspect where an edible oil/fat is not blended into the raw material mixture and a second aspect where an edible oil/fat is blended into the raw material mixture will each be described.

1. Method for Producing Starch Composition (First Aspect)

A method for producing a starch composition according to the first aspect of the present invention comprising the steps of:
 (a) preparing a raw material mixture which contains a raw starch material, one or more selected from the group consisting of an acid-treated starch and a dextrin, and an aqueous alkaline solution, the raw material mixture having a moisture content of 20 parts by mass or more and 35 parts by mass or less per 100 parts by mass of the raw material mixture (hereinafter, also referred to as "step (a)"); and
 (b) heat-treating the raw material mixture having a moisture content of 20 parts by mass or more and 35 parts by mass or less obtained in step (a) to a temperature at which the raw material mixture becomes 120° C. or higher and 150° C. or lower (hereinafter, also referred to as "step (b)").

According to the present invention, a raw material mixture having a predetermined moisture content can be heat-treated as is, without requiring the step of dehydrating the raw material mixture until the moisture content therein becomes less than 1 part by mass (i.e., less than 1 mass % of the raw material mixture) per 100 parts by mass of the raw material mixture, to impart a swelling control function to the raw starch material while preventing the loss and thermal damage of the raw starch material and auxiliary material component caused by dehydration.

Hereinafter, each of the steps will be described in detail.

Step (a)

In step (a), a raw material mixture which contains a raw starch material, one or more selected from the group consisting of an acid-treated starch and a dextrin, and an aqueous alkaline solution is prepared, the raw material mixture having a moisture content of 20 parts by mass or more and 35 parts by mass or less per 100 parts by mass of the raw material mixture.

The raw starch material is not particularly limited as long as it is a raw starch material that can be used in food products, but preferably a chemically unmodified starch, and more preferably an unmodified starch.

Preferable examples of the unmodified starch include plant-derived starches. Specific examples of plants as the source of the unmodified starch include regular corn (regular or dent corn), glutinous corn (waxy corn), high-amylose corn, non-glutinous rice, glutinous rice, wheat, sweet potatoes, potatoes, peas, mung beans, cassava, and sago palm; preferably, regular corn, glutinous corn, high-amylose corn, non-glutinous rice, glutinous rice, wheat, potatoes, peas, mung beans, and cassava; more preferably, regular corn, glutinous corn, high-amylose corn, glutinous rice, potatoes, peas, and cassava; and still more preferably regular corn, glutinous corn, potatoes, peas, and cassava. The raw starch material may be selected as appropriate according to the purpose and application.

While the mass ratio of the raw starch material to 100 parts by mass of the raw material mixture is not particularly limited, it is preferably 56 parts by mass or more and 79 parts by mass or less, more preferably 56 parts by mass or more and 75 parts by mass or less, still more preferably 56 parts by mass or more and 70 parts by mass or less, and particularly preferably 58 parts by mass or more and 68 parts by mass or less.

When numerical ranges are indicated herein, the upper and lower limit values of each numerical range may be combined as appropriate.

Either only one of an acid-treated starch or a dextrin may be used, or both acid-treated starch and dextrin may be used. According to the present invention, one or more of an acid-treated starch and a dextrin are contained in the raw material mixture so that acid hydrolysis of the raw starch material involved in the heat treatment in step (b) can be suppressed even if the raw material mixture contains a certain amount of water, thereby obtaining a starch composition having a desired swelling control function.

The acid-treated starch is not particularly limited as long as it is a raw starch material that has been acid-treated. The raw starch material of the acid-treatment starch is preferably an unmodified starch, where examples thereof preferably include regular corn, glutinous corn, high-amylose corn, non-glutinous rice, glutinous rice, wheat, potatoes, peas, mung beans, cassava, and sago palm; more preferably, regular corn, glutinous corn, high-amylose corn, glutinous rice, potatoes, peas, and cassava; and still more preferably, regular corn, glutinous corn, high-amylose corn, peas, cassava, and potatoes.

An acid-treated starch is obtained by acid-treating a raw starch material in an aqueous acid solution. Specific examples of the acid used for the acid treatment include inorganic acids such as hydrochloric acid, sulfuric acid, and nitric acid.

The number-average molecular weight of the acid-treated starch is preferably 250,000 or more and 500,000 or less, more preferably 250,000 or more and 450,000 or less, still more preferably 270,000 or more and 400,000 or less, yet still more preferably 300,000 or more and 370,000 or less, and particularly preferably 300,000 or more and 350,000 or less. The number-average molecular weight of the acid-treated starch can be determined by gel filtration chromatography (GPC) using pullulan equivalents as standard.

While the mass ratio of the acid-treated starch to 100 parts by mass of the raw material mixture is not particularly limited, it is preferably 0.5 parts by mass or more and 20 parts by mass or less, more preferably 0.5 parts by mass or more and 18 parts by mass or less, still more preferably 0.8 parts by mass or more and 18 parts by mass or less, particularly preferably 0.8 parts by mass or more and 15 parts by mass or less, even more preferably 0.8 parts by mass or more and 13 parts by mass or less, and yet even more preferably 0.8 parts by mass or more and 10 parts by mass or less.

If, however, the raw material mixture does not contain a dextrin, the mass ratio of the acid-treated starch to 100 parts by mass of the raw material mixture is preferably 0.5 parts by mass or more and 20 parts by mass or less, more preferably 0.8 parts by mass or more and 20 parts by mass or less, still more preferably 0.8 parts by mass or more and 18 parts by mass or less, and particularly preferably 0.8 parts by mass or more and 15 parts by mass or less.

By blending the acid-treated starch into the raw material mixture, a starch composition that has functions similar to those of a cross-linked starch can be obtained, such as showing less swelling upon heating or resistance to heating. Furthermore, according to a preferred embodiment of the present invention, a starch composition that has a highest viscosity close to that of its raw starch material, but that shows less swelling upon heating or resistance to heating can be obtained. In addition, according to a preferred embodiment of the present invention, a starch composition whose coloring is suppressed and applications are not limited can be obtained.

While the dextrin is not limited, the DE (dextrose equivalent: degree of degradation) of the dextrin is preferably 5 or higher but lower than 50, and more preferably 5 or higher and 35 or lower. DE of a dextrin is a measure of its reducing power relative to the reducing power of glucose, a typical reducing sugar, which is set 100, and it can serve as an indicator of the degree of degradation. The DE of the dextrin is more preferably 5 or higher and 33 or lower, still more preferably 10 or higher and 30 or lower, and particularly preferably 15 or higher and 30 or lower. The DE of the dextrin is preferably within the above range from the viewpoint of suppressing coloring of the starch composition.

The DE of the dextrin can be measured by the method described in "Starch Sugar-Related Industrial Analysis Methods", pp. 107-108, published by Food Chemical Newspaper Inc., 1991.

The mass ratio of the dextrin to 100 parts by mass of the raw material mixture is preferably 0.1 parts by mass or more and 20 parts by mass or less, more preferably 0.2 parts by mass or more and 15 parts by mass or less, still more preferably 0.2 parts by mass or more and 10 parts by mass or less, and particularly preferably 0.3 parts by mass or more and 8 parts by mass or less.

If, however, the raw material mixture does not contain an acid-treated starch, the mass ratio of the dextrin to 100 parts by mass of the raw material mixture is preferably 0.5 parts by mass or more and 20 parts by mass or less, more preferably 0.5 parts by mass or more and 18 parts by mass or less, still more preferably 0.5 parts by mass or more and 15 parts by mass or less, particularly preferably 0.5 parts by mass or more and 10 parts by mass or less, and even more preferably 0.5 parts by mass or more and 8 parts by mass or less.

By blending a dextrin into the raw material mixture, a starch composition that has functions similar to those of a cross-linked starch can be obtained, such as showing less swelling upon heating or resistance to heating. According to a preferred embodiment of the present invention, a starch composition that has a highest viscosity close to that of its raw starch material, but that shows less swelling upon heating or resistance to heating can be obtained. In addition, a starch composition can be obtained which will have smooth viscosity when water is added. Furthermore, it is possible to obtain a retort-resistant starch composition that has little difference in food texture and texture before and after retort processing (heat treatment under pressure).

The dextrin may be blended into the raw material mixture in a form of powder, granular, or liquid, or it may be dissolved in water in advance and blended into the raw material mixture as an aqueous dextrin solution. The use of an aqueous dextrin solution allows the dextrin to act more uniformly on the raw starch material.

In this case, the mass ratio of the dextrin contained in the aqueous dextrin solution to 100 parts by mass of the raw material mixture should be such that its mass in terms of dextrin is within the range above.

The amount of moisture contained in the aqueous dextrin solution should be such that the moisture content in the raw material mixture, together with the amount of moisture contained in the aqueous alkaline solution described below, is in a range of 20 parts by mass or more and 35 parts by mass or less per 100 parts by mass of the raw material mixture. According to the present invention, the type of water is not particularly limited as long as it can be used in food products and may be, for example, natural water or tap water.

According to the present invention, an acid-treated starch and a dextrin can also be used in combination. According to a preferred embodiment of the present invention, combined use of an acid-treated starch and a dextrin not only impart a swelling control function to the raw starch material, but it can also impart retort resistance, and can provide a starch composition with less coloring and a smooth viscosity when added with water.

In a case where an acid-treated starch and a dextrin are used together, the mass ratio of the acid-treated starch to 100 parts by mass of the raw material mixture is not particularly limited, but it is preferably 0.5 parts by mass or more and 20 parts by mass or less, more preferably 0.5 parts by mass or more and 15 parts by mass or less, still more preferably 0.8 parts by mass or more and 13 parts by mass or less, particularly preferably 0.8 parts by mass or more and 10 parts by mass or less, even more preferably 0.8 parts by mass or more and 8 parts by mass or less, and yet even more preferably 0.8 parts by mass or more and 5 parts by mass or less.

Moreover, the mass ratio of the dextrin to 100 parts by mass of the raw material mixture is preferably 0.1 parts by mass or more and 20 parts by mass or less, more preferably 0.2 parts by mass or more and 15 parts by mass or less, still more preferably 0.2 parts by mass or more and 10 parts by mass or less, particularly preferably 0.3 parts by mass or more and 8 parts by mass or less, and even more preferably 0.3 parts by mass or more and 5 parts by mass or less.

Moreover, the total mass ratio of the acid-treated starch and the dextrin to 100 parts by mass of the raw material mixture is usually 0.6 parts by mass or more and 24 parts by mass or less, preferably 0.6 parts by mass or more and 15 parts by mass or less, more preferably 0.6 parts by mass or more and 10 parts by mass or less, still more preferably 1 part by mass or more and 10 parts by mass or less, and particularly preferably 2.5 parts by mass or more and 7.5 parts by mass or less.

According to the present invention, the pH of the aqueous alkaline solution is preferably 9.0 or higher and 10.5 or lower, more preferably 9.0 or higher and 10.0 or lower, still more preferably 9.0 or higher and 9.8 or lower, and particularly preferably 9.2 or higher and 9.7 or lower.

An alkali used in the aqueous alkaline solution is not particularly limited as long as it can be used in food products. For example, the alkali is preferably one or more selected from the group consisting of calcium hydroxide, sodium carbonate, calcium carbonate, potassium carbonate, sodium hydrogen carbonate or dipotassium hydrogen phosphate, more preferably sodium carbonate, potassium carbonate, sodium hydrogen carbonate or dipotassium hydrogen phosphate, and still more preferably sodium carbonate or sodium hydrogen carbonate.

The mass ratio of the alkali to 100 parts by mass of the raw material mixture is preferably 0.05 parts by mass or more and 0.5 parts by mass or less, more preferably 0.05 parts by mass or more and 0.4 parts by mass or less, still more preferably 0.1 parts by mass or more and 0.3 parts by mass or less, and particularly preferably 0.15 parts by mass or more and 0.3 parts by mass or less.

In step (a), the raw material mixture is adjusted to have a moisture content of 20 parts by mass or more and 35 parts by mass or less per 100 parts by mass of the raw material mixture. The moisture content in the raw material mixture is preferably 22 parts by mass or more and 35 parts by mass or less, more preferably 25 parts by mass or more and 35 parts by mass or less, still more preferably 25 parts by mass or more and 33 parts by mass or less, and particularly preferably 27 parts by mass or more and 33 parts by mass or less, per 100 parts by mass of the raw material mixture.

The amount of water contained in the aqueous alkaline solution should be such that the moisture content in the raw material mixture satisfies the above range. As mentioned above, when an aqueous dextrin solution is used as the dextrin, the amount of water in the aqueous alkaline solution and the amount of water in the aqueous dextrin solution in total should satisfy the above range.

In step (a), a raw material, one or more selected from the group consisting of an acid-treated starch and a dextrin, and an aqueous alkaline solution are mixed to prepare a raw material mixture. Specifically, the raw material mixture can be prepared, for example, as follows.

First, an alkali is weighed and dissolved in water to prepare an aqueous alkaline solution.

Next, a raw starch material and one or more selected from the group consisting of an acid-treated starch and a dextrin are each weighed, fed into a mixer, stirred while the aqueous alkaline solution is added, and stirred further.

For more homogeneous mixing, it is preferable to stop stirring halfway to drop the raw material mixture adhering to the wall inside the vessel and the stirrer, and stir the mixture further.

When an aqueous dextrin solution is used, the aqueous dextrin solution may be prepared separately from the aqueous alkaline solution and added to the mixer, or an alkali and a dextrin may be dissolved in water together to prepare an aqueous solution containing the alkali and the dextrin and added to the mixer.

Specifically, first, an alkali and a dextrin are each weighed and dissolved in water to prepare an aqueous solution.

Next, a raw starch material and optionally an acid-treated starch are each weighed and added to the mixer.

Subsequently, the raw starch material and the optional acid-treated starch are stirred in the mixer while the above aqueous solution is added and stirred further.

Again, in order to mix more homogeneously, it is preferable to stop stirring halfway to drop the raw material mixture adhering to the wall inside the vessel and the stirrer, and stir the mixture further.

Thus, a raw material mixture having a moisture content of 20 parts by mass or more and 35 parts by mass or less per 100 parts by mass of the raw material mixture is prepared as described above by mixing until the components become homogeneous.

Step (b)

Next, in step (b), the raw material mixture having a moisture content of 20 parts by mass or more and 35 parts by mass or less obtained in step (a) is heat-treated to a temperature at which the raw material mixture becomes 120° C. or higher and 150° C. or lower.

As described above, in step (b), the raw material mixture having a moisture content of 20 parts by mass or more and 35 parts by mass or less is heat-treated as is. According to the present invention, the raw material mixture is heat-treated to a temperature of 120° C. or higher and 150° C. or lower without undergoing, between steps (a) and (b), a dehydration step for reducing the moisture content in the raw material mixture to less than 1 part by mass per 100 parts by mass of the raw material mixture, thereby preventing the loss and thermal damage of the raw starch material caused by dehydration.

The temperature of the heat treatment is up to a temperature where the raw material mixture becomes 120° C. or higher and 150° C. or lower, preferably up to a temperature where the raw material mixture becomes 120° C. or higher and 145° C. or lower, more preferably up to a temperature where the raw material mixture becomes 125° C. or higher and 145° C. lower, and still more preferably up to a temperature where the raw material mixture becomes 125° C. or higher and 140° C. or lower. Once heating is started, the temperature of the raw material mixture gradually increases. The temperature of the heat treatment in this case refers to the temperature of the raw material mixture (heat-treated product) at the end of the heat treatment, which is substantially the highest temperature of the raw material mixture during the heat treatment.

The method of the heat treatment is not particularly limited as long as it can heat-treat the raw material mixture with a moisture content of 20 parts by mass or more and 35 parts by mass or less at the above temperature, and various types of heating/drying equipment can be used. Examples of the equipment include a shelf-type hot-air circulating dryer (hereinafter also referred to as a "shelf dryer"), a tabletop heating stirrer, an air current drying equipment, a band-type through-flow dryer, a fluid layer drying equipment, a rotary drying equipment, a disk dryer, a cylinder dryer, and an inverted conical mixer/dryer.

For example, in a case where the heat treatment takes place in a shelf-type hot-air circulating dryer, the raw material mixture is spread evenly on a tray and the tray is placed in the temperature-controlled dryer to be heat-treated. Stirring and sampling are preferably performed over time for uniform heat treatment. The heating time is generally from 1 hour to 6 hours, more preferably from 1 hour to 4 hours, and still more preferably from 2 hours 30 minutes to 3 hours 30 minutes. Once the heat treatment is complete, the resultant is allowed to cool.

If necessary, the holding time may be set at the temperature of the heat treatment. The holding time is preferably from 0.5 to 5 hours, more preferably from 0.5 to 3 hours, and still more preferably from 0.5 to 1 hour.

The completion of the heat treatment can be determined by the viscosity pattern (e.g., breakdown).

In a case where the heat treatment takes place in a tabletop heating stirrer, the temperature of the raw material mixture can be increased rapidly by setting the pot to the set temperature, and uniform heating is possible by stirring the raw material mixture with the stirring blade. Again, even in this case, it is preferable to perform stirring and sampling over time to ensure more uniform heat treatment. The heating time is preferably from 1 hour to 6 hours, more preferably from 1 hour to 4 hours, and still more preferably from 2 hours 30 minutes to 3 hours 30 minutes. Once the heat treatment is complete, the resultant is allowed to cool.

Note that steps (a) and (b) may be performed consecutively in the same equipment. For example, steps (a) and (b) can be performed consecutively by using a powder/granule mixing/drying equipment (e.g., "Ribocone" manufactured by Okawara MDF, Co., Ltd.), which has a vertical-type inverted conical vessel accommodating a helical ribbon rotor blade.

Specifically, an alkali is first weighed and dissolved in water to prepare an aqueous alkaline solution.

Next, a raw starch material and one or more selected from the group consisting of an acid-treated starch and a dextrin are each weighed and fed into the mixer.

Then, stirring and heating are initiated in the mixer.

Subsequently, the aqueous alkaline solution is fed into the mixer. To make the reaction more uniform, the aqueous alkaline solution is preferably added at a constant rate.

Sampling is performed over time and once the heat treatment is complete, the resultant is allowed to cool.

When an aqueous dextrin solution is used, the aqueous dextrin solution may be prepared separately from the aqueous alkaline solution and added to the mixer, or an alkali and a dextrin may be dissolved in water to prepare an aqueous solution containing the alkali and the dextrin and added to the mixer.

Specifically, first, an alkali and a dextrin are each weighed and dissolved in water to prepare an aqueous solution.

Next, a raw starch material and optionally an acid-treated starch are each weighed and added to the mixer.

Then, stirring and heating are initiated in the mixer.

Subsequently, the above aqueous solution is added to the mixer. In this case, again, the aqueous solution is preferably added at a constant rate to make the reaction more uniform.

Sampling is performed over time and once the heat treatment is complete, the resultant is allowed to cool.

In the first aspect of the present invention, a starch composition of interest can be obtained by performing steps (a) and (b) as described above.

According to the present invention, a starch composition of interest can be obtained without requiring, between steps (a) and (b), a step of dehydrating the raw material mixture until the moisture content therein becomes less than 1 part by mass per 100 parts by mass of the raw material mixture. Since the present invention does not require the above-described dehydration step between steps (a) and (b), leaching of the raw starch material and the auxiliary material components such as the acid-treated starch, dextrin, and alkali into the dehydrating solution can be prevented and the wastewater load due to the leached components can be reduced. In addition, heat damage to the raw starch material can be minimized by not going through dehydration that employs a drying step. Furthermore, the production steps and equipment can be simplified, thereby improving productivity.

If necessary, the obtained starch composition may be subjected to a step of washing by adding water and a pH adjuster (step (c)), and further a step of dehydrating or drying the resulting washed product (step (d)). Steps (c) and (d) can improve the retort resistance of the resulting starch composition.

Hereinafter, steps (c) and (d) will be described.

Step (c)

In step (c), the heat-treated product obtained in step (b) is washed by adding water and a pH adjuster thereto.

In step (c), the heat-treated product obtained in step (b) is washed so that alkali is removed, thereby decolorizing and neutralizing the heat-treated product. According to a preferred embodiment of the present invention, the retort resistance, heat swelling control, increase in the final viscosity, and transparency when water is added can be improved in the resulting starch composition.

The mass ratio of water to 100 parts by mass of the heat-treated product is preferably 300 parts by mass or more and 1,000 parts by mass or less, more preferably 300 parts by mass or more and 800 parts by mass or less, still more preferably 400 parts by mass or more and 800 parts by mass or less, and particularly preferably 400 parts by mass or more and 500 parts by mass or less.

The pH adjuster is not particularly limited as long as it is commonly used in food applications, and examples thereof include adipic acid, citric acid, trisodium citrate, gluconic acid, succinic acid, lactic acid, potassium carbonate, sodium hydrogen carbonate, sodium hydrogen phosphate, dipotassium hydrogen phosphate, sodium pyrophosphate, sodium metaphosphate, and sodium polyphosphate.

The amount of the pH adjuster used is suitably determined within a range where the pH value when water and the pH adjuster are added to the heat-treated product is preferably 4 or more and 7 or less, more preferably 5 or more and 7 or less, and even more preferably 5 or more and 6 or less.

Step (d)

In step (d), the washed product obtained in step (c) is dehydrated or dried.

The dehydration or drying can be carried out by selecting a method using a machine such as a centrifuge, filter press, drum dryer, spray dryer, airflow dryer, air current drying equipment, fluid layer drying equipment, fluid bed drying equipment, or flash dryer. In the present invention, it is preferable to dehydrate or dry the product in a centrifuge or flash dryer used in existing facilities or the like.

The dehydration or drying is carried out until the moisture content in the final starch composition preferably becomes 15 parts by mass or less per 100 parts by mass of the raw material mixture.

In the first aspect of the present invention, steps (a) and (b), and if necessary steps (c) and (d), are performed to obtain a starch composition having functions similar to those of a cross-linked starch such as showing less swelling upon heating or being resistant to heating, thereby obtaining a starch composition having a swelling control function. Furthermore, according to a preferred embodiment, a starch composition that has a highest viscosity close to that of its raw starch material, but that shows less swelling upon heating or resistance to heating can be provided.

According to a preferred embodiment, the starch composition obtained by this production method will have a smooth viscosity when added with water, and is also retort resistant with little difference in the food texture and texture before and after retort processing. Moreover, according to a preferred embodiment, the starch composition obtained by this production method has less coloring and can be used in a wide range of applications. The starch composition obtained by this production method can favorably be used as a starch composition for various food products, including, for example, curry, hashed beef, stew, soup, sauce, dressing, processed meat and fish products, and processed vegetable protein products.

2. Method for Producing Starch Composition (Second Aspect)

In the second aspect of the present invention, a raw material mixture which contains a raw starch material, one or more selected from the group consisting of an acid-treated starch and a dextrin, an aqueous alkaline solution, and further an edible oil/fat is prepared in step (a). The raw material mixture further contains an edible oil/fat, which not only imparts a swelling control function to the raw starch material, but also allows oil/fat modification to take place.

Thus, a method for producing a starch composition according to the second aspect of the present invention comprises the steps of:

(a) preparing a raw material mixture which contains a raw starch material, one or more selected from the group consisting of an acid-treated starch and a dextrin, an aqueous alkaline solution, and an edible oil/fat, the raw material mixture having a moisture content of 20 parts by mass or more and 35 parts by mass or less per 100 parts by mass of the raw material mixture; and (b) heat-treating the raw material mixture having a moisture content of 20 parts by mass or more and 35 parts by mass or less obtained in step (a) to a temperature at which the raw material mixture becomes 120° C. or higher and 150° C. or lower.

Step (a)

In a method for producing a starch composition according to the second aspect, step (a) is the same as step (a) of the method for producing a starch composition according to the first aspect, except that the raw material mixture further contains an edible oil/fat.

The raw starch material, one or more selected from the group consisting of an acid-treated starch and a dextrin, and aqueous alkaline solution can be the same as those described for the first aspect.

The mass ratios of the raw starch material, one or more selected from the group consisting of an acid-treated starch and a dextrin, and aqueous alkaline solution to 100 parts by mass of the raw material mixture are in the same ranges as those described for the first aspect, respectively, but they may be adjusted accordingly considering the addition of the edible oil/fat.

For example, the mass ratio of the raw starch material to 100 parts by mass of the raw material mixture is preferably 56 parts by mass or more and 79 parts by mass or less, more preferably 56 parts by mass or more and 75 parts by mass or less, still more preferably 56 parts by mass or more and 70 parts by mass or less, and particularly preferably 58 parts by mass or more and 68 parts by mass or less.

In the case where an acid-treated starch is used, the mass ratio of the acid-treated starch to 100 parts by mass of the raw material mixture is preferably 0.5 parts by mass or more and 20 parts by mass or less, more preferably 0.5 parts by mass or more and 18 parts by mass or less, still more preferably 0.8 parts by mass or more and 18 parts by mass or less, particularly preferably 0.8 parts by mass or more and 15 parts by mass or less, even more preferably 0.8 parts by mass or more and 13 parts by mass or less, and yet even more preferably 0.8 parts by mass or more and 10 parts by mass or less.

If the raw material mixture does not contain dextrin, however, the mass ratio of the acid-treated starch to 100 parts by mass of the raw material mixture is preferably 0.5 parts by mass or more and 20 parts by mass or less, more preferably 0.8 parts by mass or more and 20 parts by mass or less, still more preferably 0.8 parts by mass or more and 18 parts by mass or less, and particularly preferably 0.8 parts by mass or more and 15 parts by mass or less.

Moreover, if a dextrin is used, the mass ratio of the dextrin to 100 parts by mass of the raw material mixture is preferably 0.1 parts by mass or more and 20 parts by mass or less, more preferably 0.2 parts by mass or more and 18 parts by mass or less, still more preferably 0.2 parts by mass or more and 15 parts by mass or less, particularly preferably 0.2 parts by mass or more and 10 parts by mass or less, and even more preferably 0.3 parts by mass or more and 8 parts by mass or less.

If the raw material mixture does not contain an acid-treated starch, however, the mass ratio of the dextrin to 100 parts by mass of the raw material mixture is preferably 0.5 parts by mass or more and 20 parts by mass or less, more preferably 0.5 parts by mass or more and 18 parts by mass or less, still more preferably 0.5 parts by mass or more and 15 parts by mass or less, particularly preferably 0.5 parts by mass or more and 10 parts by mass or less, and even more preferably 0.5 parts by mass or more and 8 parts by mass or less.

In a case where an acid-treated starch and a dextrin are used together, the mass ratio of the acid-treated starch to 100 parts by mass of the raw material mixture is not particularly limited, but it is preferably 0.5 parts by mass or more and 20 parts by mass or less, more preferably 0.5 parts by mass or more and 15 parts by mass or less, still more preferably 0.8 parts by mass or more and 13 parts by mass or less, particularly preferably 0.8 parts by mass or more and 10 parts by mass or less, even more preferably 0.8 parts by mass or more and 8 parts by mass or less, and yet even more preferably 0.8 parts by mass or more and 5 parts by mass or less.

Moreover, the mass ratio of the dextrin to 100 parts by mass of the raw material mixture is preferably 0.1 parts by mass or more and 20 parts by mass or less, more preferably 0.2 parts by mass or more and 15 parts by mass or less, still more preferably 0.2 parts by mass or more and 10 parts by mass or less, particularly preferably 0.3 parts by mass or more and 8 parts by mass or less, and even more preferably 0.3 parts by mass or more and 5 parts by mass or less.

Moreover, the total mass ratio of the acid-treated starch and the dextrin to 100 parts by mass of the raw material mixture is usually 0.6 parts by mass or more and less than 24 parts by mass, preferably 0.6 parts by mass or more and 15 parts by mass or less, more preferably 0.6 parts by mass or more and 10 parts by mass or less, still more preferably 1 part by mass or more and 10 parts by mass or less, and particularly preferably 2.5 parts by mass or more and 7.5 parts by mass or less.

The edible oil/fat is not particularly limited as long as it is applicable to food products. Examples of the edible oil/fat include one or more selected from the group consisting of vegetable oils/fats such as soybean oil, rapeseed oil, corn oil, cottonseed oil, rice oil, sunflower oil, safflower oil (e.g., high-linoleic safflower oil), sesame oil, olive oil, peanut oil, kapok oil, evening primrose oil, linseed oil, perilla oil, palm oil, palm kernel oil, and coconut oil; animal oils/fats such as fish oil, lard, tallow, and milk fat; triglycerides of medium-chain fatty acids; and processed oils/fats obtained by subjecting these oils/fats to one or more kinds of processing selected from the group consisting of transesterification, hydrogenation, and fractionation.

Among these, the edible oil/fat is preferably an oil/fat with an iodine value of 100 or higher, and more preferably an oil/fat with an iodine value of 140 or higher. Specifically, it is preferably one or more selected from the group consisting of soybean oil, rapeseed oil, corn oil, cottonseed oil, rice oil, sunflower oil, high-linoleic safflower oil, sesame oil, olive oil, linseed oil, perilla oil, and palm oil, and more preferably one or more selected from the group consisting of soybean oil, rapeseed oil, corn oil, sunflower oil, high-linoleic safflower oil, olive oil, linseed oil, and palm oil. Examples of an oil/fat with an iodine value of 140 or higher include high-linoleic safflower oil and linseed oil. Preferably, it is high-linoleic safflower oil.

The mass ratio of the edible oil/fat to 100 parts by mass of the raw material mixture is preferably 0.05 parts by mass or more and 1.5 parts by mass or less, more preferably 0.08 parts by mass or more and 1.5 parts by mass or less, still more preferably 0.1 parts by mass or more and 1 part by mass or less, and particularly preferably 0.1 parts by mass or more and 0.8 parts by mass or less.

In step (a) of the second aspect, a raw starch material, one or more selected from the group consisting of an acid-treated starch and a dextrin, an aqueous alkaline solution, and an edible oil/fat are mixed to prepare a raw material mixture. Specifically, the raw material mixture can be prepared, for example, as follows.

First, an alkali is weighed and dissolved in water to prepare an aqueous alkaline solution.

Next, a raw starch material and one or more selected from the group consisting of an acid-treated starch and a dextrin are each weighed and fed into a mixer.

Subsequently, the raw starch material, and one or more selected from the group consisting of an acid-treated starch and a dextrin are stirred in the mixer while the aqueous alkaline solution is added, and stirred further. Alternatively, the acid-treated starch and the dextrin may be mixed in the aqueous alkaline solution before being mixed with the raw starch material.

Next, an edible oil/fat is added and stirred further. Alternatively, the edible oil/fat can be added simultaneously with the above aqueous alkaline solution, acid-treated starch, and dextrin.

For more homogeneous mixing, it is preferable to stop stirring halfway to drop the raw material mixture adhering to the wall inside the vessel and the stirrer with a spatula or the like, or it is preferable to stir using a mixer that has a mechanism to drop the adhered raw material mixture.

If an aqueous dextrin solution is used, the aqueous dextrin solution may be prepared separately from the aqueous alkaline solution and added to the mixer, or an alkali and a dextrin may be dissolved in water together to prepare an aqueous solution containing the alkali and the dextrin and added to the mixer.

Specifically, first, an alkali and a dextrin are each weighed and dissolved in water to prepare an aqueous solution.

Next, a raw starch material and optionally an acid-treated starch are each weighed and added to the mixer.

Subsequently, the raw starch material and the optional acid-treated starch are stirred in the mixer while the above aqueous solution is added and stirred further.

Then, an edible oil/fat is added and stirred further.

Again, in order to mix more homogeneously, it is preferable to stop stirring halfway to drop the raw material mixture adhering to the wall inside the vessel and the stirrer with a spatula or the like, or it is preferable to stir using a mixer that has a mechanism to drop the adhered raw material mixture.

Thus, a raw material mixture having a moisture content of 20 parts by mass or more and 35 parts by mass or less per 100 parts by mass of the raw material mixture is prepared as described above by mixing until the components become homogeneous.

Step (b)

In step (b), the raw material mixture having a moisture content of 20 parts by mass or more and 35 parts by mass or less is heat-treated as is. In the second aspect, again, the raw material mixture is heat-treated to a temperature of 120° C. or higher and 150° C. or lower without undergoing, between steps (a) and (b), a dehydration step for reducing the moisture content in the raw material mixture to less than 1 part by mass per 100 parts by mass of the raw material mixture, thereby preventing the loss and thermal damage of the raw starch material and auxiliary material component caused by dehydration.

The temperature of the heat treatment is up to a temperature where the raw material mixture becomes 120° C. or higher and 150° C. or lower, preferably up to a temperature where the raw material mixture becomes 120° C. or higher and 145° C. or lower, more preferably up to a temperature where the raw material mixture becomes 125° C. or higher and 145° C. lower, and still more preferably up to a temperature where the raw material mixture becomes 125° C. or higher and 140° C. or lower.

The method of the heat treatment is not particularly limited as long as it can heat-treat a raw material mixture with a moisture content of 20 parts by mass or more and 35 parts by mass or less at the above temperature, and various types of heating/drying equipment can be used. Examples of the equipment include a shelf-type hot-air circulating dryer (hereinafter also referred to as a "shelf dryer"), a tabletop heating stirrer, an air current drying equipment, a band-type through-flow dryer, a fluid layer drying equipment, a rotary drying equipment, a disk dryer, a cylinder dryer, and an inverted conical mixer/dryer.

In a case where the heat treatment takes place in a shelf-type hot-air circulating dryer, the raw material mixture is spread evenly on a tray and the tray is placed in the temperature-controlled dryer to be heat-treated. Stirring and sampling are preferably performed over time for uniform heat treatment. The heating time is from 1 hour to 6 hours, more preferably from 1 hour to 4 hours, and still more preferably from 2 hours 30 minutes to 3 hours 30 minutes. Once the heat treatment is complete, the resultant is allowed to cool.

If necessary, a holding time may be set at the temperature of the heat treatment. The holding time is preferably from 0.5 to 5 hours, more preferably from 0.5 to 3 hours, and still more preferably from 0.5 to 1 hour.

The completion of the heat treatment can be determined by the viscosity measurement (breakdown).

In a case where the heat treatment takes place in a tabletop heating stirrer, the temperature of the raw material mixture can be increased rapidly by setting the pot to the set temperature, and uniform heating is possible by stirring the raw material mixture with the stirring blade. Again, even in this case, it is preferable to perform stirring and sampling over time to ensure more uniform heat treatment. The heating time is preferably from 1 hour to 6 hours, more preferably from 1 hour to 4 hours, and still more preferably from 2 hours 30 minutes to 3 hours 30 minutes. Once the heat treatment is complete, the resultant is allowed to cool.

As in the first aspect, steps (a) and (b) may be performed consecutively in the same equipment. For example, steps (a) and (b) can be performed consecutively by using a powder/granule mixing/drying equipment, which has a vertical-type inverted conical vessel accommodating a helical ribbon rotor blade.

Specifically, an alkali is first weighed and dissolved in water to prepare an aqueous alkaline solution.

Next, a raw starch material and one or more selected from the group consisting of an acid-treated starch and a dextrin are each weighed and fed into a mixer.

Then, stirring and heating are initiated in the mixer.

Subsequently, the aqueous alkaline solution is fed into the mixer. To make the reaction more uniform, the aqueous alkaline solution is preferably added at a constant rate.

Next, an edible oil/fat is added and stirred further. To make the reaction more uniform, the edible oil/fat is preferably added at a constant rate.

Sampling is performed over time and once the heat treatment is complete, the resultant is allowed to cool.

When an aqueous dextrin solution is used, the aqueous dextrin solution may be prepared separately from the aqueous alkaline solution and added to the mixer, or an alkali and a dextrin may be dissolved in water to prepare an aqueous solution containing the alkali and the dextrin and added to the mixer.

Specifically, first, an alkali and a dextrin are each weighed and dissolved in water to prepare an aqueous solution.

Next, a raw starch material and optionally an acid-treated starch are each weighed and added to the mixer.

Then, stirring and heating are initiated in the mixer.

Subsequently, the above aqueous solution is added to the mixer. In this case, again, the aqueous solution is preferably added at a constant rate to make the reaction more uniform.

Next, an edible oil/fat is added and stirred further. To make the reaction more uniform, the edible oil/fat is preferably added at a constant rate.

Sampling is performed over time and once the heat treatment is complete, the resultant is allowed to cool.

In the second aspect of the present invention, a starch composition of interest can be obtained by performing steps (a) and (b) as described above.

According to the present invention, a starch composition of interest can be obtained without requiring, between steps (a) and (b), a step of dehydrating the raw material mixture until the moisture content therein becomes less than 1 part by mass per 100 parts by mass of the raw material mixture. Since the present invention does not require the above-described dehydration step between steps (a) and (b), leaching of the raw starch material and the auxiliary material components such as the acid-treated starch, dextrin, and alkali into the dehydrating solution can be prevented and the wastewater load due to the leached components can be reduced. In addition, heat damage to the raw starch material can be minimized by not going through dehydration that employs a drying step. Furthermore, since the treatment for imparting a swelling control function and the treatment of oil/fat modification can be performed at the same time, the production steps and equipment can be simplified, thereby improving productivity.

In the second aspect of the present invention, it is preferable not to perform steps (c) and (d) described in the first aspect since the obtained starch composition is modified with an oil/fat.

In the second aspect of the present invention, steps (a) and (b) are performed to obtain a starch composition having functions similar to those of a cross-linked starch such as showing less swelling upon heating or being resistant to heating, thereby obtaining a starch composition having a swelling control function. According to a preferred embodiment, a starch composition having functions similar to those of a cross-linked starch while having a highest viscosity close to that of its raw starch material can be obtained. In addition, it is also possible to obtain a starch composition that not only has a swelling control function but that also has undergone oil/fat modification.

According to a preferred embodiment of the present invention, the starch composition obtained by this production method will have a smooth viscosity when added with water, and is also retort resistant with little difference in the food texture and texture before and after retort processing. Moreover, according to a preferred embodiment of the present invention, the starch composition obtained by this production method has less coloring and can be used in a wide range of applications. According to a preferred embodiment of the present invention, the treatment of oil/fat modification can be performed, together with the treatment that imparts the swelling control function, so as to give an improved hard food texture and to impart elasticity to the food texture of protein-containing products. Since the treatment of oil/fat modification increases the affinity for oil, the effect of preventing sedimentation of the starch composition can also be obtained. The starch composition obtained by this production method can favorably be used as a starch composition for various food products, including, for example, curry, hashed beef, stew, soup, sauce, dressing, processed meat and fish products, and processed vegetable protein products.

EXAMPLES

Hereinafter, the present invention will be described in more detail by way of examples, although the present invention is not limited in any way to these examples.

[1] Preparation of Starch Compositions (Part 1)

Raw material mixtures were prepared using the compositions listed in Table 1-1, and heat-treated under the conditions listed in Table 1-2 to obtain starch compositions.

<Method for preparing starch composition (using shelf dryer)>

1. First, the alkali and the dextrin were weighed and dissolved in distilled water. The amount of water used for the preparation indicated in the table refers to the amount per 100 parts by mass of the raw starch material.

2. Next, the raw starch material was weighed and added to a mixer ("Food processor KC-4626" manufactured by Twinbird Corporation).
3. The mixer was turned on and the aqueous solution prepared in 1 was fed through the feed port.
4. After stirring in the mixer for about 30 to 40 seconds, starch that adhered to the wall and blades inside the mixer was dropped with a spatula or the like.
5. Stirring in the mixer was resumed for a total of 90 seconds to prepare a raw material mixture.
6. The raw material mixture obtained in 5 was spread on a tray and placed in a shelf dryer ("WFO-400" manufactured by Tokyo Rikakikai Co., Ltd. (EYE-LA)) controlled at 150° C. to be heat-treated for the time shown in the table, thereby obtaining a starch composition. The temperature of the raw material mixture at the end of the heat treatment is indicated in the table as "Temperature of product at the end of treatment".

<Method for Preparing Starch Composition (Using Tabletop Heating Stirrer)>

1. First, the alkali and the dextrin were weighed and dissolved in distilled water. The amount of water used for the preparation indicated in the table refers to the amount per 100 parts by mass of the raw starch material.
2. Next, the raw starch material was weighed and added to a mixer ("Super Mixer" manufactured by Kawata MFG, Co., Ltd.).
3. The mixer was turned on and the aqueous solution prepared in 1 was fed through the feed port.
4. After stirring in the mixer for about 30 to 40 seconds, starch that adhered to the wall and blades inside the mixer was dropped with a spatula or the like.
5. Stirring in the mixer was resumed for a total of 90 seconds to prepare a raw material mixture.
6. The pot of a tabletop heating stirrer ("KR Mini" manufactured by Kajiwara Inc.) was set at 150° C. The raw material mixture obtained in 5 was fed into this pot and heat-treated for the time indicated in the table to obtain a starch composition. The temperature of the raw material mixture at the end of the heat treatment is indicated in the table as "Temperature of product at the end of treatment".

<Method for Preparing Starch Compositions of Comparative Examples>

In addition, a starch composition was prepared according to the method described in Patent literature 2 to obtain the starch composition of Comparative example 1-1. The moisture content in the raw material mixture after the dehydration was 50.50 parts by mass per 100 parts by mass of the raw material mixture.

For comparative examples other than Comparative example 1-1, starch compositions were prepared by the same preparation method as the above-described example using the compositions and heat treatment conditions listed in Tables 1-1 and 1-2.

<Viscosities of Starch Compositions>

Viscosities (RVU) of the obtained starch compositions were measured using "RVA" (Rapid Visco Analyzer) manufactured by Newport Scientific Pty. Ltd. "RVA" is an instrument that can continuously measure viscosity at programmed temperature and rotational speed of the stirring blade. Viscosity is expressed in RVA unit (indicated "RVU"), which is almost equal to a value obtained by dividing the value of pascal-seconds (Pa·s), i.e., unit of viscosity in the SI (International unit system), divided by 0.012.

1. The product and water were mixed in a special aluminum container to prepare a slurry where the mass concentration of the product in terms of dry matter was 6 mass %. A special paddle was placed in the above aluminum container, which was then set in the RVA.
2. Viscosity was measured while stirring at 160 rpm and maintaining the temperature at 40° C. for 1 minute and then heating from 40° C. to 95° C. at a rate of 6° C./min.
3. After maintaining the temperature at 95° C. for 5 minutes, it was cooled to 50° C. at 6° C./min.
4. Viscosity A (cP), which is the highest viscosity when heated to 95° C., and viscosity B (cP), which is the lowest hold viscosity at 90° C., were read to measure each viscosity. The breakdown value was calculated by subtracting viscosity B from viscosity A.

In addition, the final viscosity (pre-retort viscosity at 50° C.) and the post-retort viscosity were measured for the starch compositions obtained in some of the examples and comparative examples using the procedure shown below.

5. The final viscosity (pre-retort viscosity at 50° C.) refers to the viscosity obtained when the sample from 3 was maintained at 50° C. for 5 minutes.
6. The sample from 5 was transferred to a retort package and subjected to retort processing (treatment of holding at 121° C. for 20 minutes).
7. The retort-processed sample from 6 was conditioned to 50° C., transferred to the special aluminum container of RVA, and set in the RVA again.
8. The post-retort viscosity at 50° C. refers to the viscosity of the product that was maintained at 50° C. for 6 minutes.

Each parameter will be described below.

The highest viscosity is preferably higher than or equal to the highest viscosity of the raw starch material from the viewpoint of imparting a good food texture to the food product.

The smaller the breakdown value, the more the swelling is suppressed, and the breakdown value is ideally 0 from the viewpoint of the stability of the food texture of the food product upon heating.

From the perspective of imparting a good food texture to the retort-processed food product, the post-retort viscosity is required to be higher than or equal to the pre-retort viscosity of the raw starch material because the higher the post-retort viscosity means higher retort resistance, and because the viscosity is largely reduced in the raw starch material which affects the food texture of the food product.

<Breakdown Control Rate>

The breakdown control rate was calculated as a rate of controlling the breakdown value of the starch composition relative to the breakdown value of the raw starch material. The higher the value, the more the swelling is suppressed upon heating. The value of the breakdown control rate shows a similar behavior regardless of the type of the raw starch material. More specifically, the breakdown control rate can be calculated by the following formula. The breakdown control rates for the examples and comparative examples are shown in Table 1-2.

Breakdown control rate [%]=((Breakdown value of raw starch material)−(Breakdown value of starch composition))/(Breakdown value of raw starch material)×100

As shown in Table 1-2, when the raw starch material was mixed with the dextrin or the acid-treated starch and treated with the aqueous alkaline solution, the breakdown control rate became 45% or higher by adjusting the amount ratio of the dextrin or the acid-treated starch and the moisture content (Examples 1-1 to 1-14). On the other hand, the starch composition that underwent dehydration according to the preparation method described in Patent literature 2 had an extremely low breakdown control rate and did not show a swelling control effect (Comparative Example 1-1). In addition, the aqueous alkaline solution alone did not provide a sufficient swelling control effect (Comparative Examples 1-2 and 1-3).

From the viewpoint of making the food texture of a food product better, a higher breakdown control rate is better, and the breakdown control rate is preferably 45% or more, more preferably 60% or more, still more preferably 70% or more, and particularly preferably 80% or more.

<Highest Viscosity Ratio>

The highest viscosity ratio was calculated as a ratio of the highest viscosity value of the starch composition to the highest viscosity value of the raw starch material which was set to 1. From the perspective of providing a good food texture to a food product, it is preferably 0.6 or higher, more preferably 0.9 or higher, and particularly preferably 1 or higher. More specifically, the highest viscosity ratio can be calculated by the following formula. The obtained calculation results are shown in Table 1-2.

Highest viscosity ratio=(Highest viscosity value of starch composition)/(Highest viscosity value of raw starch material)

<Retort Viscosity Ratio>

The retort viscosity ratio was calculated as a ratio of the post-retort viscosity value of the starch composition at 50° C. to the pre-retort viscosity value of the raw starch material at 50° C. The modified starch after the retort processing is required to have, at a minimum, a post-retort viscosity value higher than or equal to a pre-retort viscosity of its raw starch material at 50° C. Therefore, the retort viscosity ratio is higher than or equal to 1, with no upper limit, from the viewpoint of imparting a good food texture to the retort-processed food product. More specifically, the retort viscosity ratio can be calculated by the following formula. The obtained calculation results are shown in Table 2.

Retort viscosity ratio=(Post-retort viscosity value of starch composition at 50° C.)/(Pre-retort viscosity value of raw starch material at 50° C.)

The breakdown value, breakdown control rate, highest viscosity value, and highest viscosity ratio for each of the examples, comparative examples, and control cases are shown in Tables 1-2.

As shown in Table 1-2, when the raw starch material was mixed with a dextrin or an acid-treated starch and treated with an aqueous alkaline solution, the breakdown value was significantly decreased compared to those without a dextrin and an acid-treated starch (Examples 1-1 to 1-10, 1-13, and 1-14). It was also shown that the combined use of a dextrin and an acid-treated starch resulted in a high swelling control effect even when they were added in small amounts (Examples 1-11 and 1-12).

On the other hand, the starch composition obtained by the preparation method involving dehydration as described in Patent literature 2 and the starch compositions obtained by adding only an aqueous alkaline solution did not show a sufficient swelling control effect (Comparative Examples 1-1 to 1-3).

These results indicate that the starch compositions produced by the method of the present invention have a swelling control function.

The waxy corn used as the raw starch material is known as a starch with a relatively high breakdown, as shown in Control case 1-1. Since swelling was effectively controlled when waxy corn was used as described above, it can be predicted that the method of the present invention will similarly control swelling when other raw starch materials are used.

<Evaluation of Whiteness of Starch Compositions>

The whiteness of the starch composition of each of the examples and comparative examples was visually evaluated in comparison to the whiteness of the raw starch material as a control (Control case 1-1). The evaluation was conducted by three expert panelists, and the results were obtained by consensus. The obtained evaluation results are shown in Table 1-2.

In the table, "◎" (A) indicates that the whiteness was equivalent to that of the control case, "○" (B) indicates that slight coloring was observed compared to the control case, and "Δ" (C) indicates that coloring was clearly observed compared to the control case.

As shown in Table 1-2, even when the raw starch material was mixed with a dextrin or an acid-treated starch and treated with an aqueous alkaline solution, coloring of the starch composition could be controlled by adjusting the amount ratio of the dextrin or the acid-treated starch and the moisture content (Examples 1-1 to 1-14). In particular, when only an acid-treated starch was used, the coloring control effect was achieved while maintaining the swelling control effect (Examples 1-9 and 1-10).

<Moisture Content in Raw Material Mixture>

"Moisture content in raw material mixture" in Table 1-1 was calculated as the moisture content (parts by mass) per 100 parts by mass of the raw material mixture, where the moisture contents of the raw starch material, acid-treated starch, and dextrin were 13 parts by mass, 13 parts by mass, and 5 parts by mass, respectively, per 100 parts by mass of their raw material powder.

TABLE 1-1

| | Raw starch material | | Alkali | Moisture content | | Dextrin | |
|---|---|---|---|---|---|---|---|
| | Kind | Content in raw material mixture [Parts by mass] | Content in raw material mixture [Parts by mass] | Water used for preparation [Parts by mass] | Moisture content in raw material mixture [Parts by mass] | No. | DE |
| Example 1-1 | Waxy corn | 68.8 | 0.16 | 16.0 | 27.0 | 1 | 22-26 |
| Example 1-2 | Waxy corn | 63.8 | 0.15 | 22.2 | 32.4 | 1 | 22-26 |

TABLE 1-1-continued

| | | | | | | | |
|---|---|---|---|---|---|---|---|
| Example 1-3 | Waxy corn | 62.6 | 0.22 | 21.8 | 31.8 | 1 | 22-26 |
| Example 1-4 | Waxy corn | 63.8 | 0.15 | 22.2 | 32.4 | 2 | Approximately 33 |
| Example 1-5 | Waxy corn | 65.1 | 0.15 | 22.6 | 32.9 | 1 | 22-26 |
| Example 1-6 | Waxy corn | 65.8 | 0.15 | 22.8 | 33.1 | 1 | 22-26 |
| Example 1-7 | Waxy corn | 65.9 | 0.15 | 22.9 | 33.2 | 1 | 22-26 |
| Example 1-8 | Waxy corn | 63.8 | 0.35 | 22.2 | 32.4 | 3 | 5-7 |
| Example 1-9 | Waxy corn | 58.8 | 0.15 | 23.0 | 33.4 | — | — |
| Example 1-10 | Waxy corn | 62.7 | 0.15 | 23.0 | 33.4 | — | — |
| Example 1-11 | Waxy corn | 67.5 | 0.17 | 16.6 | 27.8 | 1 | 22-26 |
| Example 1-12 | Waxy corn | 67.5 | 0.17 | 16.6 | 27.8 | 1 | 22-26 |
| Example 1-13 | Waxy corn | 63.8 | 0.15 | 22.2 | 32.4 | 4 | Approximately 50 |
| Example 1-14 | Waxy corn | 63.8 | 0.15 | 22.2 | 32.4 | 5 | Approximately 38 |
| Comparative example 1-1 | Waxy corn | 49.3 | 0.20 | Dehydration | 50.5 (Actual measured value) | — | — |
| Comparative example 1-2 | Waxy corn | 71.9 | 0.17 | 16.6 | 27.9 | — | — |
| Comparative example 1-3 | Waxy corn | 66.5 | 0.15 | 23.0 | 33.4 | — | — |
| Control case 1-1 | Waxy corn | 100.0 | — | — | — | — | — |

| | Dextrin | Acid-treated starch | | | |
|---|---|---|---|---|---|
| | Content in raw material mixture [Parts by mass] | Number-average molecular weight | Content in raw material mixture [Parts by mass] | Raw material mixture pH | Washing |
| Example 1-1 | 4.0 | — | — | 9.4 | Not performed |
| Example 1-2 | 3.7 | — | — | 9.4 | Not performed |
| Example 1-3 | 5.4 | — | — | 9.8 | Not performed |
| Example 1-4 | 3.7 | — | — | 9.4 | Not performed |
| Example 1-5 | 1.9 | — | — | 9.4 | Not performed |
| Example 1-6 | 1.0 | — | — | 9.4 | Not performed |
| Example 1-7 | 0.8 | — | — | 9.5 | Not performed |
| Example 1-8 | 3.7 | — | — | 9.4 | Not performed |
| Example 1-9 | — | Approximately 320,000 | 7.7 | 9.4 | Not performed |
| Example 1-10 | — | Approximately 320,000 | 3.8 | 9.5 | Not performed |
| Example 1-11 | 0.4 | Approximately 320,000 | 4.1 | 9.5 | Not performed |
| Example 1-12 | 0.4 | Approximately 320,000 | 4.1 | 9.5 | Not performed |
| Example 1-13 | 3.7 | — | — | 9.5 | Not performed |
| Example 1-14 | 3.7 | — | — | 9.5 | Not performed |
| Comparative example 1-1 | — | — | — | 9.5 | Not performed |
| Comparative example 1-2 | — | — | — | 9.5 | Not performed |
| Comparative example 1-3 | — | — | — | 9.5 | Not performed |
| Control case 1-1 | — | — | — | — | — |

TABLE 1-2

| | Conditions of heat treatment | | | | Viscosity (RVU) | | | | |
|---|---|---|---|---|---|---|---|---|---|
| | Time [Hour] | Set temperature [° C.] | Dryer | Temperature of product at the end of treatment [° C.] | Breakdown | Breakdown control rate | Highest viscosity | Highest viscosity ratio | Evaluation of whiteness |
| Example 1-1 | 3 | 150 | Shelf dryer | 130 | 17.9 | 80.2 | 120.4 | 0.9 | ○ |
| Example 1-2 | 3 | 150 | Shelf dryer | 125 | 14.2 | 84.4 | 116.6 | 0.8 | ○ |
| Example 1-3 | 3 | 150 | Shelf dryer | 125 | 4.2 | 95.3 | 80.7 | 0.6 | Δ |
| Example 1-4 | 3 | 150 | Shelf dryer | 125 | 25.0 | 72.5 | 138.3 | 1.0 | Δ |
| Example 1-5 | 3 | 150 | Shelf dryer | 125 | 24.1 | 73.5 | 137.4 | 1.0 | ○ to Δ |
| Example 1-6 | 3 | 150 | Shelf dryer | 125 | 37.5 | 58.6 | 159.2 | 1.2 | ○ |
| Example 1-7 | 3 | 150 | Shelf dryer | 125 | 27.2 | 70.0 | 160.9 | 1.2 | ○ |
| Example 1-8 | 3 | 150 | Shelf dryer | 125 | 28.9 | 68.2 | 134.2 | 1.0 | ○ |
| Example 1-9 | 3 | 150 | Shelf dryer | 125 | 29.0 | 68.1 | 96.9 | 0.7 | ◎ |
| Example 1-10 | 3 | 150 | Shelf dryer | 125 | 46.8 | 48.4 | 118.2 | 0.9 | ◎ |
| Example 1-11 | 3.5 | 150 | Shelf dryer | 130 | 26.9 | 70.4 | 110.8 | 0.8 | ○ |
| Example 1-12 | 3.15 | 150 | Tabletop heating stirrer | 125 | 38.5 | 57.5 | 112.3 | 0.8 | ○ |
| Example 1-13 | 3 | 150 | Shelf dryer | 125 | 39.4 | 56.5 | 143.3 | 1.0 | Δ |
| Example 1-14 | 3 | 150 | Shelf dryer | 125 | 34.8 | 61.7 | 140.4 | 1.0 | Δ |
| Comparative example 1-1 | 3 | 150 | Shelf dryer | 135 | 88.1 | 2.8 | 165.2 | 1.2 | ○ |
| Comparative example 1-2 | 3 | 150 | Shelf dryer | 125 | 68.2 | 24.8 | 128.2 | 0.9 | ◎ |
| Comparative example 1-3 | 3 | 150 | Shelf dryer | 125 | 79.4 | 12.4 | 148.2 | 1.1 | ◎ |
| Control case 1-1 | — | — | — | — | 90.7 | 0.0 | 137.9 | 1.0 | ◎ |

The ingredients in the tables were as follows.

Waxy corn: "Waxy corn starch" manufactured by J-OIL MILLS

Alkali: Sodium carbonate

Dextrin 1 (DE 22-26): "Sandec #250" manufactured by Sanwa Starch Co. Ltd., 15% pentasaccharide, 13% hexasaccharide Dextrin 2 (DE 33): "TETRUP" manufactured by Hayashibara Co., Ltd., 54.2% tetrasaccharide Dextrin 3 (DE 5-7): "FZ-100" containing dextrin and waxy corn, manufactured by Maruzen Chemicals Co., Ltd.

Dextrin 4 (DE approximately 50): "SUNMALT S" manufactured by Hayashibara Co., Ltd., 92% or more disaccharide Dextrin 5 (DE approximately 38): Puretose L (Gunei Chemical Industry Co., Ltd.), 55% or more trisaccharide Acid-treated starch (number-average molecular weight: approximately 320,000): Acid treatment was performed by adding 80 parts by mass of 6 mass % hydrochloric acid to 320 parts by mass of an aqueous dispersion of 40 mass % waxy corn starch (manufactured by J-OIL MILLS), and stirring the mixture at 40° C. for 24 hours. After the acid treatment, the resultant was neutralized with hydrated lime to a pH of 5, washed, and dried to obtain an acid-treated starch.

The viscosities of Examples 1-6, 1-8, and 1-13, as well as those of Comparative examples 1-2 and 1-3 were measured at 50° C. before and after retort processing and they were compared to the viscosity of Control case 1-1. The results are shown in Table 2. Table 2 suggests that mixing a dextrin or an acid-treated starch with the raw starch material and treating the mixture with an aqueous alkaline solution can impart retort resistance compared to the case without the dextrin and the acid-treated starch. In addition, the use of a dextrin with a DE value of less than 50 resulted in a retort viscosity ratio of 1 or higher, suggesting that starch compositions with better retort resistance could be obtained (Examples 1-6 and 1-8).

TABLE 2

| | Pre-retort Viscosity at 50° C. | Post-retort Viscosity at 50° C. | Retort viscosity ratio |
|---|---|---|---|
| Example 1-6 | 175.0 | 100.7 | 1.8 |
| Example 1-8 | 135.4 | 74.5 | 1.3 |
| Example 1-13 | 142.8 | 41.3 | 0.7 |
| Comparative example 1-2 | 89.8 | 48.7 | 0.9 |
| Comparative example 1-3 | 93.7 | 52.5 | 0.9 |
| Control case 1-1 | 57.2 | 34.9 | 0.6 |

[2] Preparation of Starch Compositions (Part 2)

Raw material mixtures were prepared using the compositions listed in Table 3-1, and heat-treated under the conditions listed in Table 3-2 to obtain starch compositions.

The method for preparing the starch compositions was the same as that described in [1] above. Each of the obtained starch compositions was washed and dehydrated or dried as follows to obtain a washed starch composition.

<Washing and Dehydration/Drying of Starch Compositions>

The starch composition was dissolved in 5 times its amount of water using a stirrer to obtain a pH-adjusted slurry whose pH was adjusted with a pH adjuster to a range of preferably from 4 to 7, more preferably from 5 to 7, and still more preferably from 5 to 6. The resulting pH-adjusted slurry was dehydrated or dried to obtain a washed starch composition. The amount of water used for the preparation indicated in the table refers to the amount per 100 parts by mass of the raw starch material.

The viscosities of the resulting washed starch compositions were measured in the same manner as the method described in [1] above. The breakdown values, breakdown control rates, highest viscosity values, and highest viscosity ratios are shown in Table 3-2. In addition, the breakdown value, breakdown control rate, highest viscosity value, and highest viscosity ratio of waxy corn are also shown in the table as Control case 2-1.

As shown in Table 3, washing resulted in a high swelling control effect (Examples 2-1 to 2-12). It was also shown that the combined use of a dextrin and an acid-treated starch resulted in a high swelling control effect even when they were added in small amounts (Examples 2-6 to 2-12).

TABLE 3-1

| | Raw starch material | | Alkali | Moisture content | | |
|---|---|---|---|---|---|---|
| | Kind | Content in raw material mixture [Parts by mass] | Content in raw material mixture [Parts by mass] | Water used for preparation [Parts by mass] | Moisture content raw material mixture [Parts by mass] | Dextrin No. |
| Example 2-1 | Waxy corn | 58.8 | 0.15 | 23.0 | 33.4 | — |
| Example 2-2 | Waxy corn | 62.7 | 0.15 | 23.0 | 33.4 | — |
| Example 2-3 | Waxy corn | 64.6 | 0.15 | 23.0 | 33.4 | — |
| Example 2-4 | Waxy corn | 65.7 | 0.15 | 23.0 | 33.4 | — |
| Example 2-5 | Waxy corn | 63.8 | 0.15 | 22.2 | 32.4 | 1 |
| Example 2-6 | Waxy corn | 62.4 | 0.15 | 23.0 | 33.3 | 1 |
| Example 2-7 | Waxy corn | 64.3 | 0.15 | 23.0 | 33.3 | 1 |
| Example 2-8 | Waxy corn | 65.4 | 0.15 | 23.0 | 33.3 | 1 |
| Example 2-9 | Waxy corn | 65.3 | 0.15 | 22.9 | 33.2 | 1 |
| Example 2-10 | Waxy corn | 67.5 | 0.17 | 16.6 | 27.8 | 1 |
| Example 2-11 | Waxy corn | 67.5 | 0.17 | 16.6 | 27.8 | 1 |
| Example 2-12 | Waxy corn | 64.2 | 0.15 | 22.9 | 33.2 | 1 |
| Control case 2-1 | Waxy corn | 100,0 | — | — | — | — |

| | Dextrin | | Acid-treated starch | | | |
|---|---|---|---|---|---|---|
| | DE | Content raw material mixture [Parts by mass] | Number-average molecular weight | Content in material mixture [Parts by mass] | Raw material mixture pH | Washing |
| Example 2-1 | — | — | Approximately 320,000 | 7.7 | 9.4 | Performed |
| Example 2-2 | — | — | Approximately 320,000 | 3.8 | 9.4 | Performed |
| Example 2-3 | — | — | Approximately 320,000 | 1.9 | 9.4 | Performed |
| Example 2-4 | — | — | Approximately 320,000 | 0.8 | 9.4 | Performed |
| Example 2-5 | 22-26 | 3.7 | — | — | 9.4 | Performed |
| Example 2-6 | 22-26 | 0.4 | Approximately 320,000 | 3.8 | 9.4 | Performed |
| Example 2-7 | 22-26 | 0.4 | Approximately 320,000 | 1.9 | 9.4 | Performed |
| Example 2-8 | 22-26 | 0.4 | Approximately 320,000 | 0.8 | 9.4 | Performed |
| Example 2-9 | 22-26 | 0.6 | Approximately 320,000 | 0.8 | 9.4 | Performed |
| Example 2-10 | 22-26 | 0.4 | Approximately 320,000 | 4.1 | 9.4 | Performed |
| Example 2-11 | 22-26 | 0.4 | Approximately 320,000 | 4.1 | 9.4 | Performed |
| Example 2-12 | 22-26 | 0.6 | Approximately 320,000 | 1.9 | 9.4 | Performed |
| Control case 2-1 | — | — | — | — | — | — |

TABLE 3-2

| | Conditions of heat treatment | | | | Viscosity (RVU) | | | |
|---|---|---|---|---|---|---|---|---|
| | Time [Hour] | Set temperature [° C.] | Dryer | Temperature of product at the end of treatment [° C.] | Breakdown | Breakdown control rate | Highest viscosity | Highest viscosity ratio |
| Example 2-1 | 3 | 150 | Shelf dryer | 125 | 20.1 | 77.9 | 89.1 | 0.6 |
| Example 2-2 | 3 | 150 | Shelf dryer | 125 | 29.1 | 67.9 | 107.2 | 0.8 |
| Example 2-3 | 3 | 150 | Shelf dryer | 125 | 38.3 | 57.8 | 125.7 | 0.9 |
| Example 2-4 | 3 | 150 | Shelf dryer | 125 | 44.2 | 51.2 | 139.4 | 1.0 |

TABLE 3-2-continued

| | Conditions of heat treatment | | | | Viscosity (RVU) | | | |
|---|---|---|---|---|---|---|---|---|
| | Time [Hour] | Set temperature [° C.] | Dryer | Temperature of product at the end of treatment [° C.] | Breakdown | Breakdown control rate | Highest viscosity | Highest viscosity ratio |
| Example 2-5 | 3 | 150 | Shelf dryer | 125 | 39.3 | 56.6 | 158.9 | 1.2 |
| Example 2-6 | 3 | 150 | Shelf dryer | 125 | 1.2 | 98.7 | 119.8 | 0.9 |
| Example 2-7 | 3 | 150 | Shelf dryer | 125 | 17.8 | 80.3 | 120.3 | 0.9 |
| Example 2-8 | 3 | 150 | Shelf dryer | 125 | 27.0 | 70.3 | 156.0 | 1.1 |
| Example 2-9 | 3 | 150 | Shelf dryer | 125 | 24.3 | 73.2 | 137.1 | 1.0 |
| Example 2-10 | 3.15 | 150 | Tabletop heating stirrer | 125 | 40.1 | 55.8 | 127.8 | 0.9 |
| Example 2-11 | 3.5 | 150 | Shelf dryer | 130 | 15.2 | 83.3 | 123.6 | 0.9 |
| Example 2-12 | 3 | 150 | Shelf dryer | 125 | 11.4 | 87.4 | 109.2 | 0.8 |
| Control case 2-1 | — | — | — | — | 90.7 | 0.0 | 137.9 | 1.0 |

The ingredients in the tables were as follows.

Waxy corn: "Waxy corn starch" manufactured by J-OIL MILLS

Alkali: Sodium carbonate

Dextrin 1 (DE 22-26): "Sandec #250" manufactured by Sanwa Starch Co. Ltd., 15% pentasaccharide, 13% hexasaccharide Acid-treated starch (number-average molecular weight: approximately 320,000): Acid treatment was performed by adding 80 parts by mass of 6 mass % hydrochloric acid to 320 parts by mass of an aqueous dispersion of 40 mass % waxy corn starch (manufactured by J-OIL MILLS), and stirring the mixture at 40° C. for 24 hours. After the acid treatment, the resultant was neutralized with hydrated lime to a pH of 5, washed, and dried to obtain an acid-treated starch.

The viscosities of the starch compositions of Examples 2-1 to 2-12 were measured at 50° C. before and after retort processing in the same manner as the method described in [1] above and they were compared to the viscosity of Control case 2-1. The results are shown in Table 4. As shown in Table 4, it is suggested that washing improved retort resistance (Examples 2-1 to 2-12). Furthermore, the starch compositions that showed a high swelling control effect by the dextrin and the acid-treated starch maintained the viscosity after the retort processing, indicating that they were retort resistant (Examples 2-6 to 2-9, and 2-12).

TABLE 4

| | Pre-retort Viscosity at 50° C. | Post-retort Viscosity at 50° C. | Retort viscosity ratio |
|---|---|---|---|
| Example 2-1 | 87.1 | 55.0 | 1.0 |
| Example 2-2 | 99.2 | 65.6 | 1.1 |
| Example 2-3 | 103.8 | 66.1 | 1.2 |
| Example 2-4 | 117.4 | 72.4 | 1.3 |
| Example 2-5 | 171.6 | 77.4 | 1.4 |
| Example 2-6 | 147.2 | 79.3 | 1.4 |
| Example 2-7 | 162.6 | 93.4 | 1.6 |
| Example 2-8 | 182.8 | 87.7 | 1.5 |
| Example 2-9 | 178.0 | 94.3 | 1.6 |
| Example 2-10 | 120.8 | 62.6 | 1.1 |
| Example 2-11 | 134.7 | 72.7 | 1.3 |
| Example 2-12 | 156.1 | 95.2 | 1.7 |
| Control case 2-1 | 57.2 | 34.9 | 0.6 |

Furthermore, the whiteness of the starch compositions were evaluated for Examples 2-6 and 2-10 in the same manner as the method described in [1] above, using the whiteness of the starch composition of Control case 2-1 as a control. The results are shown in Table 5. As shown in Table 5, it was found that coloring was insignificant compared to that of the control case when washing was performed.

TABLE 5

| Example 2-6 | Example 2-10 |
|---|---|
| ◎ | ◎ |

[3] Preparation of Starch Compositions (Part 3)

Raw material mixtures were prepared using the compositions listed in Table 6-1, and heat-treated under the conditions listed in Table 6-2 to obtain starch compositions.

The method for preparing the starch compositions was the same as the method described in [1] above except that an oil/fat was blended. For the examples using the powder/granule mixing/drying equipment "Ribocone" manufactured by Okawara MDF, Co., Ltd., the starch compositions were prepared as follows.

<Method for Preparing Starch Compositions (Using Powder/Granule Mixing/Drying Equipment)>

1. First, the alkali and the dextrin were weighed and dissolved in distilled water, and an oil/fat was weighed. The amount of water used for the preparation indicated in the table refers to the amount per 100 parts by mass of the raw starch material.
2. The raw starch material and the acid-treated starch were weighed and placed in the main body of the powder/granule mixing/drying equipment, and stirring and heating were initiated.
3. The aqueous solution prepared in 1 and the oil/fat were fed at a constant rate through the feed port.
4. The oil/fat was then fed at a constant rate through the feed port.
5. Sampling was performed over time.
6. At the end of heating, the resultant was cooled.

The viscosities of the resulting starch composition were measured in the same manner as the method described in [1] above, and the breakdown values and highest viscosity values are shown in Table 6-2.

As shown in Table 6-2, in the case where the oil/fat was added, again, the breakdown value was decreased when the raw starch material was mixed with a dextrin or an acid-treated starch and treated with an aqueous alkaline solution, thereby obtaining starch compositions having a swelling control function (Examples 3-1 to 3-8).

TABLE 6-1

| | Raw starch material | | Alkali | Moisture content | | |
|---|---|---|---|---|---|---|
| | Kind | Content in raw material mixture [Parts by mass] | Content in raw material mixture [Parts by mass] | Water used for preparation [Parts by mass] | Moisture content in raw material mixture [Parts by mass] | Dextrin No. |
| Example 3-1 | Regular corn | 66.4 | 0.15 | 21.1 | 31.6 | 1 |
| Example 3-2 | Regular corn | 67.9 | 0.16 | 20.4 | 31.1 | 1 |
| Example 3-3 | Waxy corn | 62.6 | 0.14 | 26.8 | 36.6 | 1 |
| Example 3-4 | Waxy corn | 61.0 | 0.16 | 20.0 | 30.8 | — |
| Example 3-5 | Waxy corn | 66.4 | 0.15 | 21.1 | 31.6 | 1 |
| Example 3-6 | Waxy corn | 71.9 | 0.17 | 15.8 | 27.1 | 1 |
| Example 3-7 | Waxy corn | 67.4 | 0.16 | 21.1 | 31.6 | 1 |
| Example 3-8 | Waxy corn | 65.0 | 0.16 | 20.0 | 30.8 | — |
| Control case 3-1 | Regular corn | 100.0 | — | — | — | — |
| Control case 3-2 | Waxy corn | 100.0 | — | — | — | — |

| | Dextrin | | Acid-treated starch | | | Amount of oil/fat added |
|---|---|---|---|---|---|---|
| | DE | Content in raw material mixture [Parts by mass] | Number-average molecular weight | Content in raw material mixture [Parts by mass] | Raw material mixture pH | Content in raw material mixture [Parts by mass] |
| Example 3-1 | 22-26 | 1.9 | — | — | 9.4 | 0.20 |
| Example 3-2 | 22-26 | 0.8 | — | — | 9.4 | 0.20 |
| Example 3-3 | 22-26 | 0.7 | — | — | 9.4 | 0.20 |
| Example 3-4 | — | — | Approximately 320,000 | 8.0 | 9.4 | 0.22 |
| Example 3-5 | 22-26 | 1.9 | — | — | 9.4 | 0.20 |
| Example 3-6 | 22-26 | 0.8 | — | — | 9.4 | 0.20 |
| Example 3-7 | 22-26 | 0.8 | — | — | 9.4 | 0.20 |
| Example 3-8 | — | — | Approximately 320,000 | 4.0 | 9.5 | 0.21 |
| Control case 3-1 | — | — | — | — | — | — |
| Control case 3-2 | — | — | — | — | — | — |

TABLE 6-2

| | Conditions of heat treatment | | | | Viscosity (RVU) | |
|---|---|---|---|---|---|---|
| | Time [Hour] | Set temperature [° C.] | Dryer | Temperature of product at the end of treatment [° C.] | Breakdown | Highest viscosity |
| Example 3-1 | 3 | 150 | Shelf dryer | 125 | 11.2 | 59.3 |
| Example 3-2 | 3 | 140 | Ribocone | 140 | 0.6 | 32.6 |
| Example 3-3 | 3 | 150 | Shelf dryer | 125 | 6.0 | 110.2 |
| Example 3-4 | 3 | 150 | Shelf dryer | 125 | 17.3 | 84.4 |
| Example 3-5 | 3 | 150 | Shelf dryer | 125 | 0.0 | 105.9 |
| Example 3-6 | 3 | 150 | Shelf dryer | 125 | 11.0 | 116.7 |
| Example 3-7 | 3 | 150 | Shelf dryer | 125 | 13.5 | 121.3 |
| Example 3-8 | 3 | 150 | Shelf dryer | 125 | 32.6 | 108.6 |
| Control case 3-1 | — | — | — | — | 13.1 | 66.7 |
| Control case 3-2 | — | — | — | — | 90.7 | 137.9 |

The ingredients in the tables were as follows.

Regular corn: "Cornstarch" manufactured by J-OIL MILLS

Waxy corn: "Waxy corn starch" manufactured by J-OIL MILLS

Alkali: Sodium carbonate

Dextrin 1 (DE 22-26): "Sandec #250" manufactured by Sanwa Starch Co. Ltd., 15% pentasaccharide, 13% hexasaccharide Acid-treated starch (number-average molecular weight: approximately 320,000): Acid treatment was performed by adding 80 parts by mass of 6 mass % hydrochloric acid to 320 parts by mass of an aqueous dispersion of 40 mass % waxy corn starch (manufactured by J-OIL MILLS), and stirring the mixture at 40° C. for 24 hours. After the acid treatment, the resultant was neutralized with hydrated lime to a pH of 5, washed, and dried to obtain an acid-treated starch.

<Evaluation of Sauce>

The following evaluation criteria were used to evaluate the taste before and after retort processing. The results are shown in Table 8.

1) Viscosity

◎ (A): Sufficiently viscous as sauce

○ (B): Viscous

Δ (C): Less viscous

X (D): Not viscous, watery

2) Unusual taste or smell

Check for the presence of unusual taste or smell (present or absent).

3) Coarseness

Check if there is an unpleasant coarseness when eating the sauce (present, somewhat present, or absent)

4) Texture

Long: Stringy with high viscous feel

Short: No stringiness with low viscous feel

TABLE 8

| | Pre-retort | | | | Post-retort | | | |
|---|---|---|---|---|---|---|---|---|
| Sample name | Viscosity | Unusual taste or smell | Coarseness | Texture | Viscosity | Unusual taste or smell | Coarseness | Texture |
| Example 2-11 | ◎ | Not present in particular | Not present in particular | Long | ○ | Not present in particular | Not present in particular | Long |
| Example 2-12 | ○ | Not present in particular | Not present in particular | Short | Δ | Not present in particular | Not present in particular | Short |
| Novation 2600 | Δ | Not present in particular | Slightly present | Long | X | Not present in particular | Slightly present | Long |
| A-15 | ○ | Not present in particular | Not present in particular | Short | ◎ | Not present in particular | Not present in particular | Short |

Oil/fat: High linoleic safflower oil "Safflower Salad Oil" manufactured by Summit Oil Mill

[4] Evaluation of Starch Compositions (Part 1)

Next, the starch compositions obtained in Examples 2-11 and 2-12 were used to prepare sauces according to the following procedure, and the taste of the sauces was evaluated in comparison with an existing product.

<Preparation of Sauces>

1. The ingredients listed in Table 7 were weighed and placed into a pot and the pot was heated until the water to be evaporated was gone. After heating, the resultant was cooled, thereby preparing a sauce.
2. 100 grams of the sauce from 1 was transferred to a retort pouch, and the remainder was transferred to a container for tasting.
3. The retort pouch from 2 was retorted at 121° C. for 20 minutes in a retort sterilizer ("HLM-36LBC" manufactured by Hirayama Manufacturing Corporation).

TABLE 7

| | Mass (%) | Amount (g) |
|---|---|---|
| Chicken bone broth | 1.5 | 4.5 |
| Soy sauce | 3 | 9.0 |
| Starch | 4 | 12.0 |
| Water | 91.5 | 274.5 |
| Total grams | 100 | 300 |
| Water to be evaporated | | 30 |
| Total amount before heating | | 330 |

The existing products used were as follows.

"Novation 2600": Waxy corn starch manufactured by Ingredion

"A-15": Acetylated waxy corn distarch phosphate manufactured by J-OIL MILLS

[5] Evaluation of Starch Compositions (Part 2)

The starch compositions obtained in Examples 3-3 to 3-8 were used to prepare batter solutions for deep-fried food products according to the following procedure. The batter solution was used to coat pork loin and the resultant was cooked in oil to evaluate the food texture using an existing product as a control.

<Preparation of Batter Solutions>

Batter solutions were prepared according to the composition shown in Table 9.

TABLE 9

| Ingredients | Weighted value (g) |
|---|---|
| Starch composition | 63 |
| Gum mixture | 7 |
| Cold water | 140 |

The ingredients in the table were as follows.

Gum mixture: 4% Xanthan gum ("Echo Gum F" manufactured by DSP Gokyo Food & Chemical Co., Ltd.), 96% corn starch ("Corn Starch Y" manufactured by J-OIL MILLS)

<Breading>

Pork loins were breaded according to the following procedure.

1. Breadcrumbs that were brought to room temperature were placed in a cooking tray.
2. The batter solution was transferred to a bowl and pork loins were dipped in the batter solution.
3. The pork loins from 2 were transferred to the cooking tray from 1 to coat with the breadcrumbs.
4. The resulting pork loins from 3 were wrapped side by side in a sheet of plastic wrap, placed on a cooking tray, and frozen in the refrigerator overnight or longer.

<Deep-Frying>

The breaded pork loins were cooked in oil at 170° C. for 4-5 minutes. In doing so, the pork loins were flipped over after 2 minutes and taken out from the oil after 4 minutes when they had floated to the surface. After allowing to cool for about 1 minute, the pork loin was cut into four equal pieces to evaluate for adhesion of breading.

<Evaluation of Adhesion>

The following evaluation criteria were used to evaluate the adhesion of the breading after oil cooking. The results are shown in Table 10.

1) Degree of apparent peeling-off (adhesion score)

○ (A): Not peeled off

Δ (B): Partially peeled off

X (C): 30% or more was peeled off

The following formula was used to calculate the adhesion score for the evaluation. The higher the score, the better the adhesion.

Score=((number of "○")×1+(number of "Δ")×0.5+(number of "x")×0)/total number evaluated×100

2) Easiness of peeling off when touched (degree of peeling-off)

◎ (A): Quite hard to peel off

○ (B): Hard to peel off

Δ (C): Slightly easy to peel off

X (D): Easy to peel off

3) Food Texture

Hardness, stickiness, crispy texture, flavor, and other unpleasant texture were evaluated comprehensively.

TABLE 10

| Sample name | Adhesion score | Degree of peeling-off | Food texture |
|---|---|---|---|
| Example 3-3 | 37.5 | Δ | Slightly stringy |
| Example 3-4 | 12.5 | X | Stringy, sticky |
| Example 3-5 | 83.3 | ○ | Crispy texture, slightly thick batter layer, good flavor |
| Example 3-6 | 87.5 | ○ | Slightly stringy, good flavor |
| Example 3-7 | 62.5 | Δ | Slightly stringy, good flavor |
| Example 3-8 | 25.0 | X | Stringy, sticky |
| HB-310 | 87.5 | X | Slightly sticky, no stringiness, soft |
| HB-150 | 87.5 | ◎ | No stringiness, hard |

The existing products used were as follows.

"HB-310": Modified starch for food products containing corn starch, manufactured by J-OIL MILLS "HB-150": Modified starch for food products containing soy flour and tapioca starch, manufactured by J-OIL MILLS <Method for Measuring Brookfield Viscosity>

Brookfield viscosity (cP(mPa·s)) was measured for the starch compositions used in the above examples according to the following procedure.

1. Powder ingredients (90 g of starch composition, 9.6 g of xanthan gum ("Echo Gum F" manufactured by DSP Gokyo Food & Chemical Co., Ltd.), and 0.4 g of cornstarch ("Cornstarch Y" manufactured by J-OIL MILLS)) were weighed in a 250 mL beaker and mixed using a spatula.
2. 200 g of cold water was added to the beaker from 1 and stirred with a spatula.
3. The mixture from 2 was stirred at 3,000 rpm using a homogenizer. The mixture was stirred with a spatula until there were no lumps.
4. After leaving the resultant to stand in ice water for 5 minutes, Brookfield viscosity was measured. Measurements were conducted using a Brookfield viscometer (BM type, No. 3 rotor, manufactured by Tokyo Keiki Inc.) at a rotational speed of 30 rpm. The values at the 15th revolution (after 30 seconds) were read, which are shown in Table 11.

TABLE 11

| Example 3-3 | Example 3-4 | Example 3-5 | Example 3-6 | Example 3-7 | Example 3-8 | HB-310 | HB-150 |
|---|---|---|---|---|---|---|---|
| 1640 cP | 900 cP | 1332 cP | 1180 cP | 1444 cP | 1004 cP | 1688 cP | 1572 cP |

As shown in Tables 10 and 11, the starch compositions obtained according to the present invention did not hugely affect the viscosity of the batter even when they were blended into the batter solution, showed sufficiently practical adhesion, and the food texture of the resulting deep-fried food products was good. In particular, when the starch composition of Example 3-5 was used, the product showed comparable adhesion to that of the existing product "HB-310" that used the same raw starch material, but it also imparted crispy texture, prevented stickiness, and had a better flavor, showing better food texture than the existing product. It was also suggested that stringiness and stickiness of the food products can be reduced by making the content of the acid-treated starch to less than 8 parts by mass (Examples 3-4 and 3-8).

The above results show that a starch composition (food ingredient) that is resistant to heat and that can impart improved food texture (e.g., pleasant tongue feel) can be obtained with simplified facilities by heat treating with a starch degradation product such as an acid-treated starch or a dextrin and an alkaline agent at an appropriate moisture content. In addition, it was also shown that oil/fat modification can be performed in the same step to obtain a starch composition (food ingredient) that can impart improved food texture.

The invention claimed is:

1. A method for producing a starch composition, comprising the steps of:

(a) preparing a raw material mixture which contains a raw starch material, one or more selected from the group consisting of an acid-treated starch and a dextrin, and an aqueous alkaline solution, the raw material mixture having a moisture content of 20 parts by mass or more and 35 parts by mass or less per 100 parts by mass of the raw material mixture; and (b) heat-treating the raw material mixture having a moisture content of 20 parts by mass or more and 35 parts by mass or less obtained in step (a) to a temperature at which the raw material mixture becomes 120° C. or higher and 150° C. or lower, wherein, if the acid-treated starch is present in the raw material mixture, the mass ratio of the acid-treated starch is 0.5 parts by mass or more and 20 parts by mass or less to 100 parts by mass of the raw material mixture, and wherein, if the dextrin is present in the raw material mixture, the mass ratio of the dextrin is 0.1 parts by mass or more and 20 parts by mass or less to 100 parts by mass of the raw material mixture.

2. The method for producing a starch composition according to claim 1, wherein the number-average molecular weight of the acid-treated starch is 250,000 or more and 500,000 or less.

3. The method for producing a starch composition according to claim 1, wherein the DE (dextrose equivalent: degree of degradation) of the dextrin is 5 or higher but less than 50.

4. The method for producing a starch composition according to claim 1, wherein the dextrin is an aqueous dextrin solution.

5. The method for producing a starch composition according to claim 1, wherein an alkali used in the aqueous alkaline solution is one or more selected from the group consisting of calcium hydroxide, sodium carbonate, calcium carbonate, potassium carbonate, sodium hydrogen carbonate, and dipotassium hydrogen phosphate.

6. The method for producing a starch composition according to claim 1, which does not require, between steps (a) and (b), a step of dehydrating the raw material mixture until the moisture content therein becomes less than 1 part by mass per 100 parts by mass of the raw material mixture.

7. The method for producing a starch composition according to claim 1, wherein the raw material mixture further contains an edible oil/fat.

8. The method for producing a starch composition according to claim 7, wherein the mass ratio of the edible oil/fat is 0.05 parts by mass or more and 1.5 parts by mass or less to 100 parts by mass of the raw material mixture.

9. The method for producing a starch composition according to claim 1, further comprising the steps of:

(c) washing the heat-treated product obtained in step (b) by adding water and a pH adjuster; and (d) dehydrating or drying the washed product obtained in step (c).

10. The method for producing a starch composition according to claim 1, wherein the mass ratio of the raw starch material is 56 parts by mass or more and 79 parts by mass or less to 100 parts by mass of the raw material mixture.

11. The method for producing a starch composition according to claim 10, wherein the number-average molecular weight of the acid-treated starch is 250,000 or more and 500,000 or less.

12. The method for producing a starch composition according to claim 10, wherein the DE (dextrose equivalent: degree of degradation) of the dextrin is 5 or higher but less than 50.

13. The method for producing a starch composition according to claim 10, wherein the dextrin is an aqueous dextrin solution.

14. The method for producing a starch composition according to claim 10, wherein an alkali used in the aqueous alkaline solution is one or more selected from the group consisting of calcium hydroxide, sodium carbonate, calcium carbonate, potassium carbonate, sodium hydrogen carbonate, and dipotassium hydrogen phosphate.

15. The method for producing a starch composition according to claim 10, which does not require, between steps (a) and (b), a step of dehydrating the raw material mixture until the moisture content therein becomes less than 1 part by mass per 100 parts by mass of the raw material mixture.

16. The method for producing a starch composition according to claim 10, wherein the raw material mixture further contains an edible oil/fat.

* * * * *